(12) United States Patent
Stadtfeld et al.

(10) Patent No.: US 10,730,123 B2
(45) Date of Patent: Aug. 4, 2020

(54) THREE-FACE BLADE COMPATIBILITY

(71) Applicant: THE GLEASON WORKS, Rochester, NY (US)

(72) Inventors: Hermann J. Stadtfeld, Webster, NY (US); Markus J. Bolze, Pittsford, NY (US); Anthony J. Norselli, Hilton, NY (US)

(73) Assignee: THE GLEASON WORKS, Rochester, NY (US)

( * ) Notice: Subject to any disclaimer, the term of this patent is extended or adjusted under 35 U.S.C. 154(b) by 275 days.

(21) Appl. No.: 15/761,827

(22) PCT Filed: Sep. 22, 2016

(86) PCT No.: PCT/US2016/053068
§ 371 (c)(1),
(2) Date: Mar. 21, 2018

(87) PCT Pub. No.: WO2017/053542
PCT Pub. Date: Mar. 30, 2017

(65) Prior Publication Data
US 2018/0264569 A1    Sep. 20, 2018

Related U.S. Application Data

(60) Provisional application No. 62/222,501, filed on Sep. 23, 2015.

(51) Int. Cl.
*B24B 3/06* (2006.01)
*B23F 21/22* (2006.01)
*B24B 3/34* (2006.01)
*B23C 5/22* (2006.01)

(52) U.S. Cl.
CPC .............. *B23F 21/226* (2013.01); *B24B 3/06* (2013.01); *B24B 3/34* (2013.01); *B23C 5/22* (2013.01)

(58) Field of Classification Search
CPC ....... B24B 53/075; B24B 3/06; B23F 21/226; B23C 5/22
USPC ..................................... 451/45, 56
See application file for complete search history.

(56) References Cited

U.S. PATENT DOCUMENTS

| 2,975,508 | A | * | 3/1961 | Picanol | ................. B23F 21/226 407/21 |
| 3,760,476 | A | * | 9/1973 | Kotthaus | ............... B23C 5/2239 407/21 |
| 4,060,881 | A | * | 12/1977 | Ryan | ..................... B23F 21/226 407/22 |
| 4,144,678 | A | * | 3/1979 | Ellwanger | ................. B24B 3/34 451/48 |
| 4,183,182 | A | * | 1/1980 | Kotthaus | ................. B24B 3/021 451/48 |

(Continued)

OTHER PUBLICATIONS

International Search Report and Written Opinion for PCT/US2016/053068, ISA/EPO, dated Jul. 28, 2017, 12 pgs.

*Primary Examiner* — George B Nguyen
(74) *Attorney, Agent, or Firm* — Robert L. McDowell

(57) ABSTRACT

A method of grinding 3-face ground cutting blades for producing gears by a face hobbing cutting process wherein the correct initial blade spacing angle φ is achieved while providing the desired values for the effective cutting edge hook angle and the effective side rake angle as well as providing a complete cutting blade front face clean-up.

2 Claims, 9 Drawing Sheets

(56) References Cited

U.S. PATENT DOCUMENTS

| | | | | |
|---|---|---|---|---|
| 4,197,038 A * | 4/1980 | Hipp | B23F 21/226 | 407/22 |
| 4,525,108 A * | 6/1985 | Krenzer | B23F 21/226 | 407/22 |
| 4,575,285 A * | 3/1986 | Blakesley | B23P 15/38 | 407/115 |
| 4,575,286 A * | 3/1986 | Blakesley | B23F 21/226 | 407/22 |
| 4,864,896 A * | 9/1989 | Pfaltzgraff | B23D 65/00 | 76/25.1 |
| 5,800,103 A * | 9/1998 | Stadtfeld | B23F 9/025 | 409/27 |
| 5,934,841 A * | 8/1999 | Rutschke | B23F 21/226 | 407/22 |
| 6,311,590 B1 | 11/2001 | Stadtfeld | | |
| 6,609,858 B1 * | 8/2003 | Francis | B23F 21/226 | 407/113 |
| 7,736,099 B2 * | 6/2010 | Cole | B23C 5/223 | 407/66 |
| 8,113,750 B2 * | 2/2012 | Hsiao | B23F 9/10 | 409/26 |
| 8,317,433 B2 * | 11/2012 | Durr | B23F 21/223 | 407/21 |
| 8,801,503 B2 * | 8/2014 | Hackman | B23F 21/22 | 451/48 |
| 8,950,301 B2 * | 2/2015 | Marx | B23F 21/128 | 82/53 |
| 9,440,299 B2 * | 9/2016 | Winkel | G05B 19/19 | |
| 2003/0044246 A1 * | 3/2003 | Erickson | B23F 21/226 | 407/21 |
| 2008/0170915 A1 * | 7/2008 | Muhlfriedel | B23F 21/226 | 407/27 |
| 2008/0279642 A1 * | 11/2008 | Stadtfeld | B23F 21/226 | 407/21 |
| 2015/0298230 A1 * | 10/2015 | Courtney | B23F 21/226 | 407/21 |
| 2018/0243849 A1 * | 8/2018 | Stadtfeld | B23F 21/223 | |

* cited by examiner

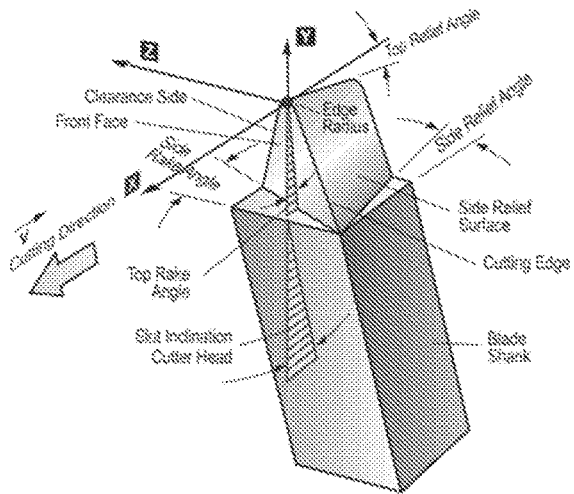 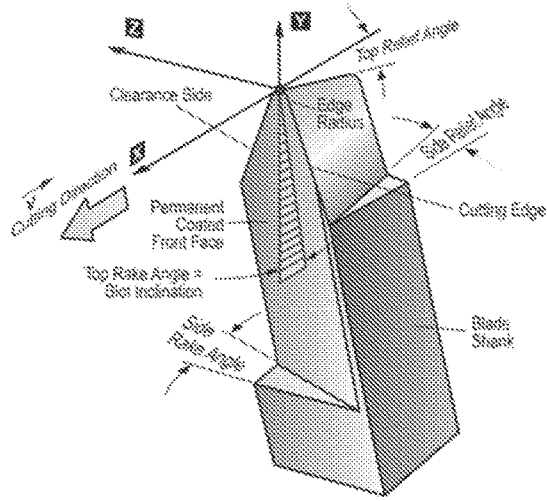
FIG. 1(a)          FIG. 1(b)
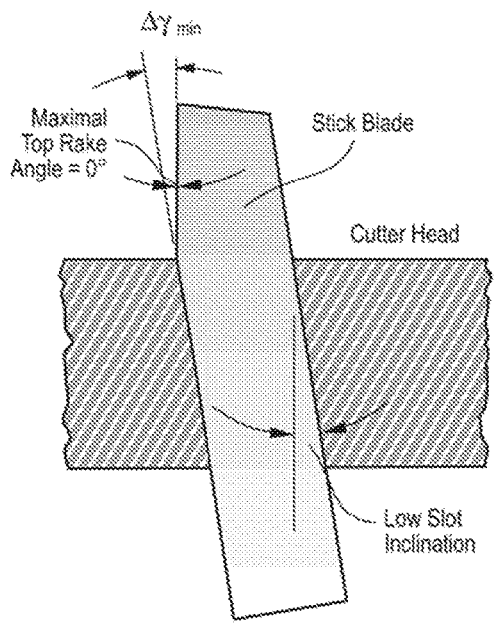 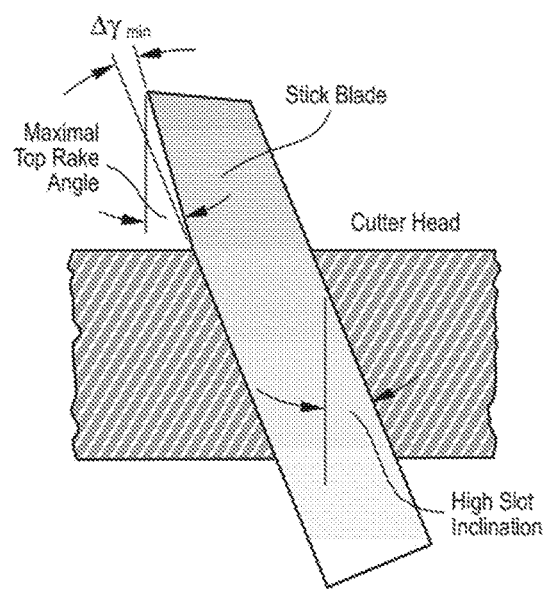
FIG. 2(a)          FIG. 2(b)

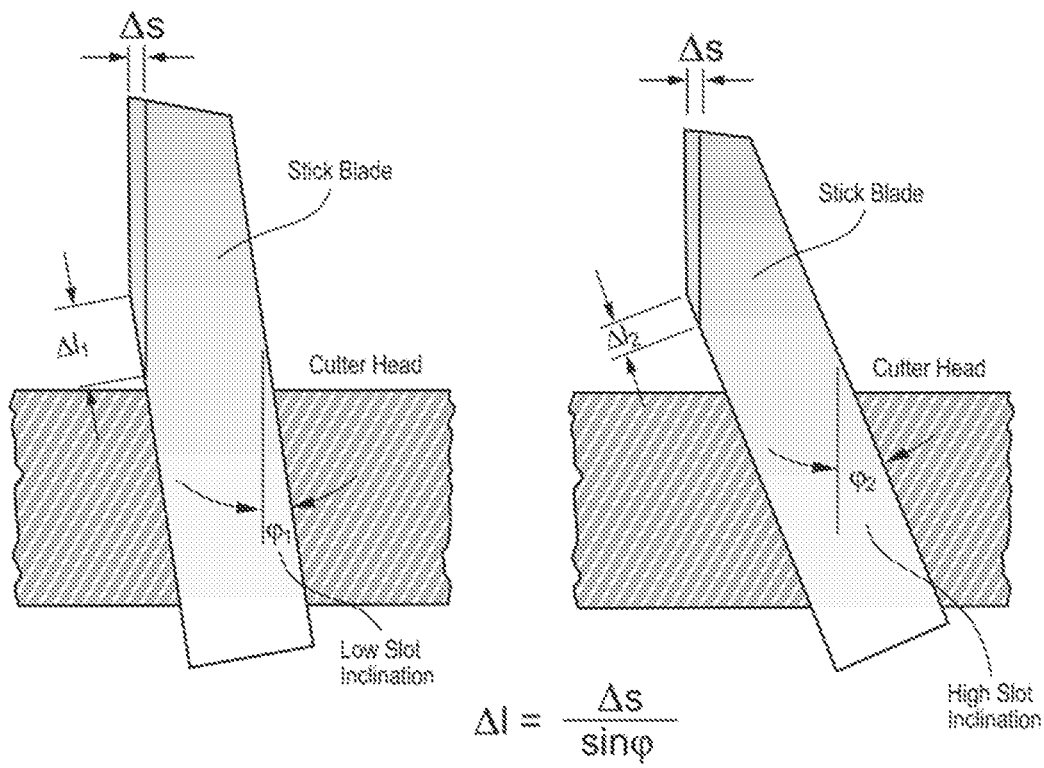
FIG. 3(a)     FIG. 3(b)
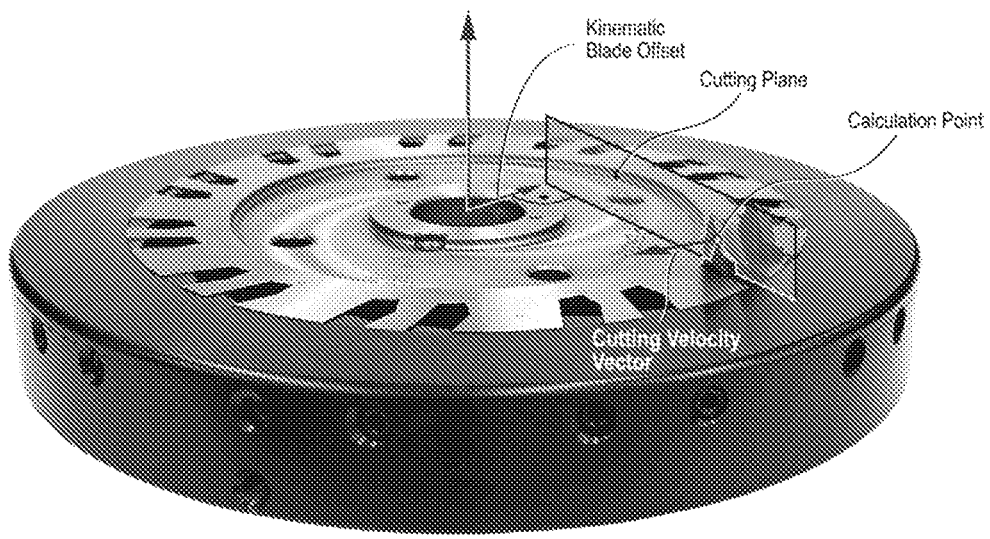
FIG. 4

| EFFECTIVE VALUES IN CUTTER HEAD | | | |
|---|---|---|---|
| | | OUTSIDE | INSIDE |
| 01 | KINEMATIC RAKE VELOCITY ANGLE | 1.33 degree | 1.33 degree |
| 02 | EFFECTIVE CUTTING EDGE HOOK ANGLE | 1.00 degree | 1.00 degree |
| 03 | EFFECTIVE TOP RAKE ANGLE | 2.78 degree | 2.67 degree |
| 04 | EFFECTIVE TOP RELIEF ANGLE | 17.33 degree | 17.33 degree |
| 05 | EFFECTIVE CUTTING SIDE RAKE ANGLE | 4.50 degree | 4.50 degree |
| 06 | MINIMUM TIP CLEAN UP TARGET | 1.00 mm | 1.00 mm |
| 07 | EFFECTIVE TIP CLEAN UP THICKNESS | 1.32 mm | 1.00 mm |

THREE-FACE BLADE COMPATIBILITY

FIELD OF THE INVENTION

The invention is directed to cutting blades for manufacturing bevel gears and to a method of maintaining proper blade spacing while preserving desired blade geometry during sharpening of cutting blades.

BACKGROUND OF THE INVENTION

In the manufacture of bevel and hypoid gears with curved flank lines, the cutting tools utilized are primarily face mill cutters or face hob cutters, such types of cutting tools are well known in the art of gear manufacture. In face mill cutters, the cutting blades are arranged to cut in line with one another about a circle in the cutter head such that one tooth slot is formed with each plunge of the cutter and the cutter must be withdrawn and the workpiece indexed to the next tooth slot position in order to form the next tooth slot.

Face hobbing comprises cutting blades arranged about a cutter, not in line with each other, but in groups, with usually two or three cutting blades per group. In two-blade groups, such as disclosed by U.S. Pat. No. 4,575,285 to Blakesley and U.S. Pat. No. 4,525,108 to Krenzer, the blade pair comprises an inner or inside cutting blade (IB blade) and an outer or outside cutting blade (OB blade). In the three-blade group, such as disclosed by U.S. Pat. No. 3,760,476 to Kotthaus, a "bottom" cutting blade is included along with an inside and outside cutting blade.

Unlike most face milling processes, in which all cutting blades pass through the tooth slot during its formation, face hobbing comprises each successive group of cutting blades passing through respective successive tooth slots with each blade in the group forming a cut completely along the longitudinal portion of the tooth slot. The cutter and the workpiece rotate in a timed relationship with each other thereby allowing continual indexing of the workpiece and continual formation of each tooth slot of the gear. If the hobbing process is of the generating type, the appropriate generating motions are superimposed with the timed relationship rotations of the tool and workpiece. Thus, in face hobbing, a single plunge of the cutting tool results in all tooth slots of the workpiece being formed.

Cutting tools for face hobbing processes usually consist of disk-shaped cutter heads with stick-type cutting blades, made from bar stock high speed steel (HSS) or carbide, for example, which are inserted and positioned in slots formed in the cutter head so as to project from a face of the cutter head. Each cutting blade comprises a face portion oriented at a predetermined angle known as a side rake angle, a cutting edge, a cutting side (or pressure angle side) surface oriented at a predetermined side relief angle, a clearance edge, a clearance side surface oriented at a predetermined side relief angle, and a tip or top surface usually oriented at a predetermined top relief angle.

In one type of cutting blade, such as that shown in previously disclosed U.S. Pat. No. 3,760,476, the cutting edge is inclined with respect to a plane containing the cutter axis (axial plane) that is oriented rotationally to contact the cutting edge, the angle of inclination being known as the effective hook angle. The effective hook angle (regardless of the number of blades per group) is comprised of two elements, the built-in hook angle and the cutting blade hook angle. The built-in hook angle is the angle of a blade mounting slot machined into a cutter head. This is the angular orientation of the cutting blade body when mounted in the cutter head and is usually in the range of about 4° to 12°. The other hook angle is the actual front face angular orientation on the cutting blade. In face hobbing, the effective hook angle, which is the angle resulting from the built-in hook angle and the actual cutting blade front face hook angle, is preferably zero degrees (0°). The skilled artisan will also understand that in cutting blades having a side rake angle, the pressure angle of the cutting edge, or any change thereof, will also have influence on the effective hook angle.

In one type of cutting blade, usually found in the two-blade per group cutting tool comprising an inside cutting blade and an outside cutting blade (previously discussed U.S. Pat. No. 4,575,285 for example), the cutting blades are sharpened by removing stock material from the cutting side and clearance side surfaces only (hereafter "two-side ground" or "2-face ground" cutting blades). See FIG. 1(a). Thus, the front face and any wear coating materials (e.g. TiN, TiAlN, AlCrN, etc.) located on the front face are preserved during sharpening. However, in the two-side ground blade, the front face is not ground during sharpening and, therefore, there is no control of effective hook angle and less flexibility to control tooth surface geometry since the side rake angle and hook angle adjustments, obtained by grinding the front face, are not available.

In another type of cutting tools (for example U.S. Pat. No. 3,760,476 discussed above) the cutting blades are sharpened by grinding the cutting side surface, the clearance side relief surface and the front face. These cutting blades will hereafter be referred to as "three-side ground" or "3-face ground" cutting blades. See FIG. 1(b). By grinding the front face, adjustments to the side rake angle and the hook angle may be effected. Such changes may be utilized to keep the effective hook angle at 0° or to influence tooth surface geometry. However, by grinding the front face, any wear coatings located on the front face are destroyed.

For either 2-face ground or 3-face ground cutting blades, sharpening may be carried out on a cutting blade grinding machine such as that disclosed in U.S. Pat. Nos. 6,808,440 or 6,824,449, the disclosures of which are hereby incorporated by reference.

In order to utilize the full potential of 3-face ground and wear coatings on all three faces (i.e. "all-around" coated blades) a cutter head slot inclination angle of, for example, 4.42° may not be sufficient. In the case of 2-face ground blades, the front face remains untouched during the re-sharpening of only pressure angle and clearance sides of the blade. The front face of 2-face blades (FIG. 1(a)) is parallel to the blade shank and has a permanent coating. After re-sharpening, the blades are ready to be built in the cutter head.

If cutting blades are all-around coated, it is then recommended to grind the front face in addition to the side relief surfaces. The reason is the continuous buildup of coating layer on the front face if no stripping between coatings occurs. Although it is possible to strip the front face coating chemically before every re-coating, this would involve additional cost and results in degradation of the steel or carbide under the repeatedly stripped surface. In case of all-around coating on 3-face cutting blades, it is recommended to grind the front face of the blades in order to remove the previous coating while also providing the opportunity to achieve more optimal top rake and side rake angles with a different front face orientation. The "package" of 3-face grinding and all-around coating delivers tool lives which can double compared to 2-face grinding with permanent front face coating.

3-face grinding of cutting blades utilized in a cutter head with, for example, 4.42° of slot tilt angle is limited with respect to the maximal achievable top rake angle which is about zero in FIG. 2(a). If the same blade is utilized in a cutter head with a 12° slot tilt angle as shown in FIG. 2(b), the achieved top rake angle would then be 7.58°. This freedom allows, for most cases of different gear geometries and cutting kinematics, the possibility to achieve a positive top rake angle.

Another important factor is the relationship between slot inclination angle and number of resharpenings. In order to accomplish an effective top rake angle of e.g. 2°, a blade built in a cutter head with a 4.42° slot inclination requires a $\Delta y$ (see FIG. 2(a) or 2(b)) for the blade grinding of 2.42°. The cleanup amount of As normal to the surface will require a large blade top down $\Delta l_1$ as shown in FIG. 3(a). If a top rake angle of 2° in the cutting process should be realized in a cutter with 12° slot tilt angle, then the blade hook angle in blade grinding will be 10°, as shown in FIG. 3(b). The relationship between top down $\Delta l_2$ and front face clean up $\Delta s$ is becoming more favorable by increasing the slot inclination angle. The number of re-sharpening for 3-face grinding in case of a 12° cutter slot tilt angle is about 2.7 times higher than that of a 4.42° cutter slot tilt angle.

The limits for the highest realistic slot inclination angles in cutter heads are given by the cutter design and manufacturing, as well as the higher tendency of the cutting forces to push the blades axially into the slots during the cutting process.

Two of the most important input parameters of blade geometry determination, after the pressure angle, are the effective side rake angle which indicates the "sharpness" of the blade and the effective cutting edge hook angle which indirectly defines the top rake angle. For a good cutting performance and for a good tool life, the effective cutting edge hook angle is the most important parameter. Because top rake angle and effective cutting edge hook angle are connected, it is preferable to define a 3-face blade geometry which achieves the desired effective cutting edge hook angle. In those certain cases where this is not possible due to geometry limitations, the closest possible value is usually utilized as the result.

In order to obtain the effective angles, the relationship between the cutting velocity vector (FIG. 4) and the blade coordinate system in FIG. 1(b) has to be considered. In the face hobbing cutter head of FIG. 4, the cutting plane is drawn in front of one outside blade. The reference point of the outside blade lies in the cutting plane. The angular orientation of the cutting plane is defined by the relative cutting velocity vector (between work gear and cutter rotation). The cutting velocity vector is oriented normal to the cutting plane.

The blade side rake angle shown in FIG. 1(b) is equal to the effective side rake angle, if the indicated cutting direction is equal to the X-axis of the blade coordinate system. The effective cutting edge hook angle (versus the blade hook angle) is shown in FIG. 5 which shows a three-dimensional view of the side of an inside blade. The cutting plane is indicated and contains the blade reference point. Between cutting plane and cutting edge, the effective cutting edge hook angle is indicated. The blade hook angle is shown between the extension of the front blade shank plane and a line which originates in the blade tip and has a neutral pressure angle of 0° (line X). The top rake angle, which is the angle that makes the blade tip appear sharp in the cutting process, is drawn between line X and the cutting plane.

Each material removal from the blade front will change the cutting velocity vector direction in FIG. 1(b) and FIG. 4 and therefore will also change the orientation of the cutting plane. This will in turn change the effective side rake angle as well as the effective cutting edge hook angle. If a particular effective side rake angle is chosen, then the blade related side rake angle target has to be reduced or increased depending on the relationship between the cutting velocity vector and the X-axis of the blade coordinate system. This still would not deliver the desired kinematic side rake angle in one calculation step because each change of the blade side rake angle will require a different front clean-up amount, which in turn changes the offset of the calculation point on the blade and, therefore, also changes the relative cutting velocity vector direction. A complete front clean-up is shown in FIG. 6(a) and a partial, but sufficient, front clean-up is shown in FIG. 6(b).

Because the amount of front clean-up depends on the chosen side rake angle and cutting edge hook angle, the physical blade offset will change which also changes the cutting velocity vector direction relative to the blade. Because of the cross influences between three parameters which are present in the solution formulae, a closed analytic solution of the 3-face blade geometry is not practical. In order to achieve a sufficient front clean-up and realize the effective input values, three imbedded iterations are required. The problem with imbedded iterations is the ability to achieve a stable and convergent behavior of the calculations while keeping the iterations fast. This goal is not achieved in the state of the art solutions which are available today.

The initial gear design utilizes either a theoretical blade, or a standard 2-face blade design. The final 3-face blade is based on a blade positioning in a real cutter head and is also based on a different front face geometry of outside and inside blades (see FIG. 7). The front face of the left blade is ground just enough so as to provide a front face clean-up down to the face of the cutter head. The right side blade is ground further back in the horizontal direction which results in a linear blade spacing of $S_x$, which is larger than the spacing S of the reference cutter which is the theoretical value of 360° divided by twice the number of blade groups. This large grind-back of the right side blade will influence the tooth thickness of the manufactured bevel pinion or bevel gear.

FIG. 8 explains how a blade spacing error of $F_d$ causes, in face hobbing, a radial error of $N_e$. In other words, the deviation from equal spacing, caused by a physically given cutter head and the 3-face blade geometry of outside and inside blades results in a tooth thickness error of the produced bevel gears. For face hobbing blades, each of the inside and outside cutting edge locations are therefore radially corrected with an amount of $\Delta R_w = N_e/2$ (with alternating signs for the inside and outside cutting blades).

Although the radial compensation of the 3-face blade will re-establish the tooth thickness, there will be some side effects. The alteration of the bade point radii compared to the calculated values causes a major side effect, namely a length crowning error on both flanks as shown in FIG. 9(a). The second 3-face blade side effect relates to the change of the effective cutting edge hook angle versus the initial 2-face value (or theoretical blade definition) which results in a flank twist as shown in FIG. 9(b). The flank twist can be eliminated by matching the effective cutting edge hook angle of the 3-face blade with the effective cutting edge hook angle of the 2-face reference blade.

The 3-face blade calculation applies the strategy of establishing the required cutter radii at the calculation point and defining side rake and top rake angles correctly with respect to the relative cutting direction given by the kinematic blade offset angle. While providing the requested blade geometry, the calculation has to assure a sufficient front face cleanup which has an influence on the resulting timing angle between the outside blade and the following inside blade. The initial timing angle φ of FIG. 10(*a*) is derived from the original 2-face calculation which is always exactly or close to 360° divided by twice the number of blade groups (which is the slot spacing angle of the cutter head). This original (i.e. initial) timing angle φ (also known as the blade spacing angle) in connection with the blade point radii of the 2-face calculation assures the cutting of the correct tooth thickness.

Three-face ground blades result in a spacing angle $\varphi_x$ as shown in FIG. 10(*b*), which, according to FIG. 8, will lead to a tooth thickness error $N_e$. If the correct tooth thickness is re-established with small cutter point radius changes, then a length crowning side effect will occur on gears cut with such a cutter which cannot be corrected (without alterations of the machine settings).

SUMMARY OF THE INVENTION

The inventors discovered that the original blade timing can be re-established. The new method is based on the idea that spacing angle $\varphi_x$ in FIG. 10(*b*) can be increased if the IB-blade (the inside blade) receives a larger front clean-up thickness and angle $\varphi_x$ can be reduced if the front clean-up thickness of the OB-blade (the outside blade) is increased. Only increasing of the front face clean-up thickness of individual blades is permissible because only then is the minimal required clean-up preserved.

A solution has been developed which achieves the correct initial blade spacing angle φ instead of $\varphi_x$ (see FIGS. 10(*a*) and 10(*b*)) and at the same time delivers the desired values for the effective cutting edge hook angle, the effective side rake angle as well as providing a complete front face clean-up.

BRIEF DESCRIPTION OF THE DRAWINGS

FIG. 1(*a*) shows a 2-face ground blade and FIG. 1(*b*) shows a 3-face ground blade. Both Figures are labeled with the blade parameter definitions and include the blade related coordinate system.

FIG. 2(*a*) shows a two-dimensional view of a blade in a cutter head with low slot inclination angle of 4.42°. The blade hook angle $\gamma_{min}$ delivers in this cutter a maximal top rake angle of 0°.

FIG. 2(*b*) shows a blade in a cutter head with a high slot inclination angle of 12°. The blade hook angle $\gamma_{min}$ delivers in this cutter a maximal top rake angle of 7.58°.

FIG. 3(*a*) illustrates a blade in a cutter head with a low slot inclination angle. A front face grind off of Δs causes a large loss of blade length $\Delta I_1$.

FIG. 3(*b*) illustrates a blade in a cutter head with a high slot inclination angle. The blade shows only a small loss of blade length $\Delta I_2$ with the same front grind off amount Δs as in FIG. 3(*a*).

FIG. 4 shows a three-dimensional view of a face hobbing cutter head with the cutting plane drawn in front of one outside blade.

FIG. 6(*b*) is a front view of a blade which also has a ground front face (3-face blade) but is only partially cleaned up on the front face.

FIG. 10(*b*) shows a cutter head with high angle slot inclination and 3-face blades wherein only one blade group (outside and inside blades) is represented.

DETAILED DESCRIPTION OF THE PREFERRED EMBODIMENT

Figure 5:
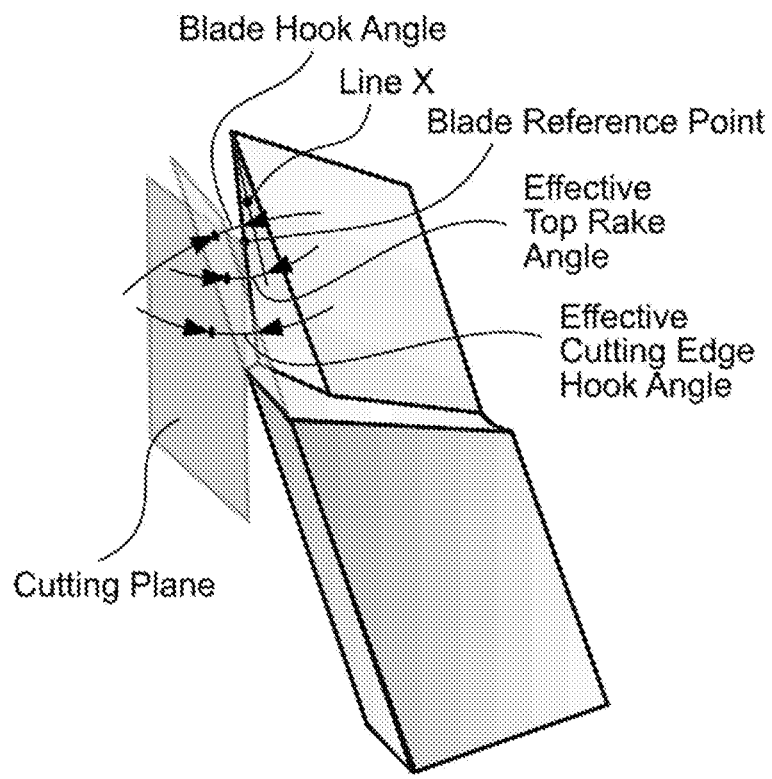
FIG. 5 shows a view onto the side of an inside blade. The cutting plane is indicated and contains the blade reference point.
Figures 6A, 6B:
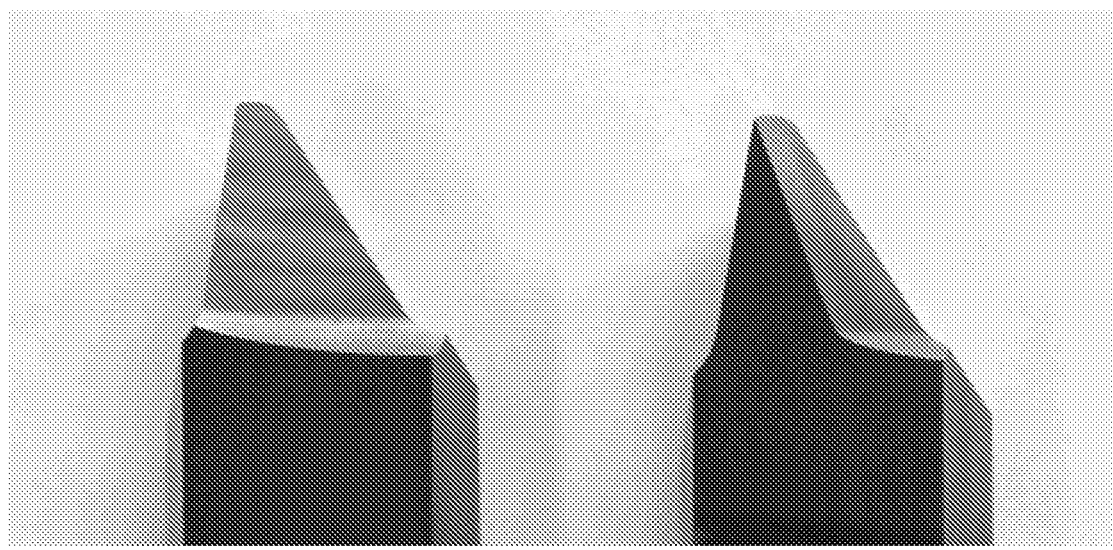
FIG. 6(*a*) is a front view of a blade which has a ground front face (3-face blade) which is completely cleaned up.
Figure 7:
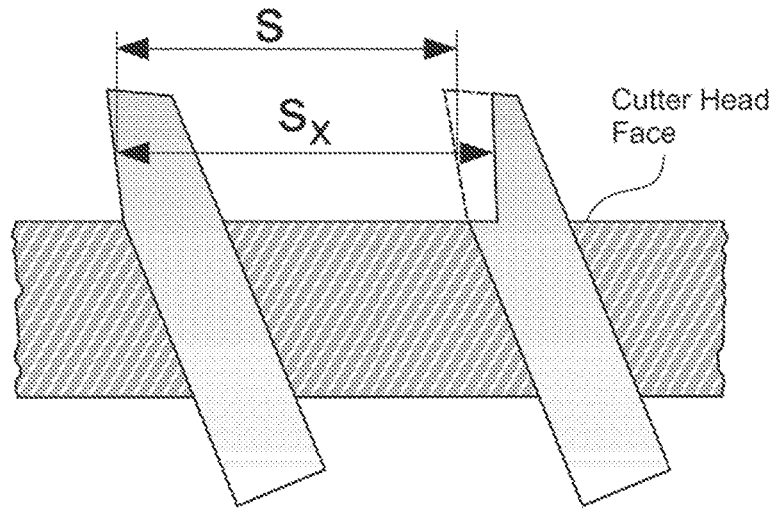
FIG. 7 shows a simplified two-dimensional view of two proceeding blades in a cutter head having a linear blade spacing of $S_x$ which is larger than the theoretical spacing S of a reference cutter.
Figure 8:
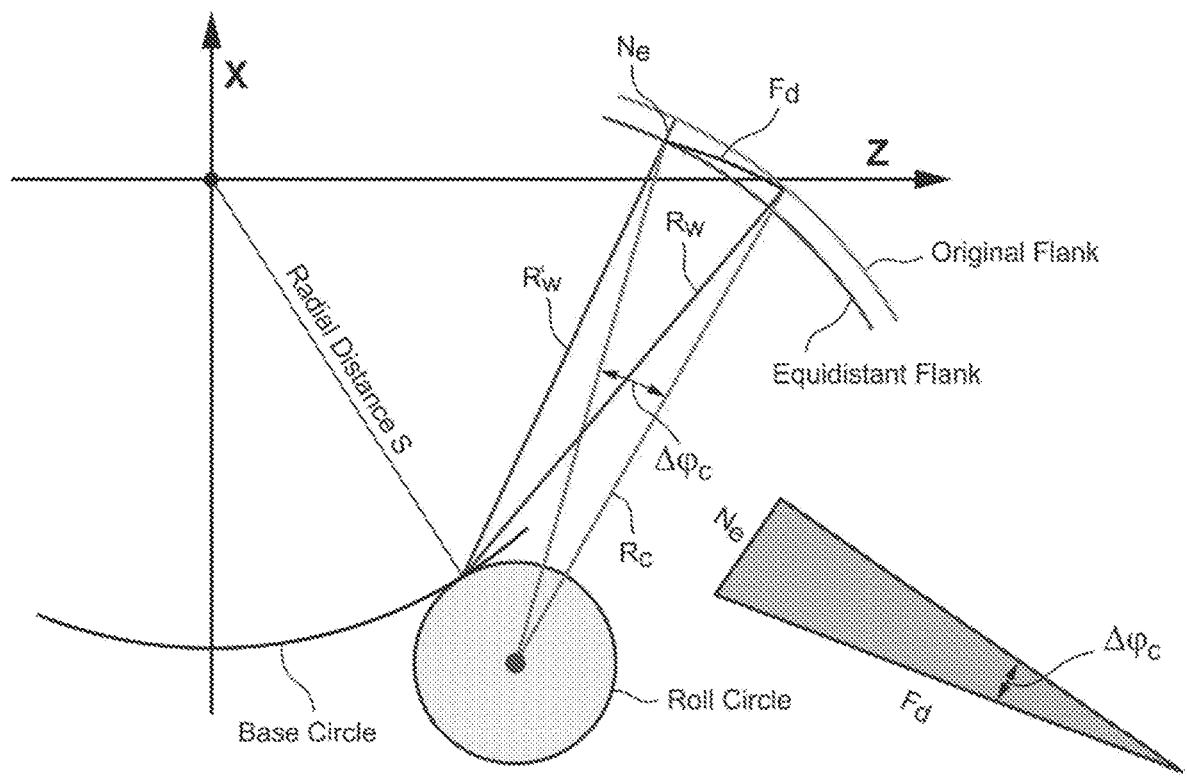
FIG. 8 illustrates how a blade spacing error of $F_d$ causes a radial error of $N_e$ in face hobbing.
Figures 9A, 9B:
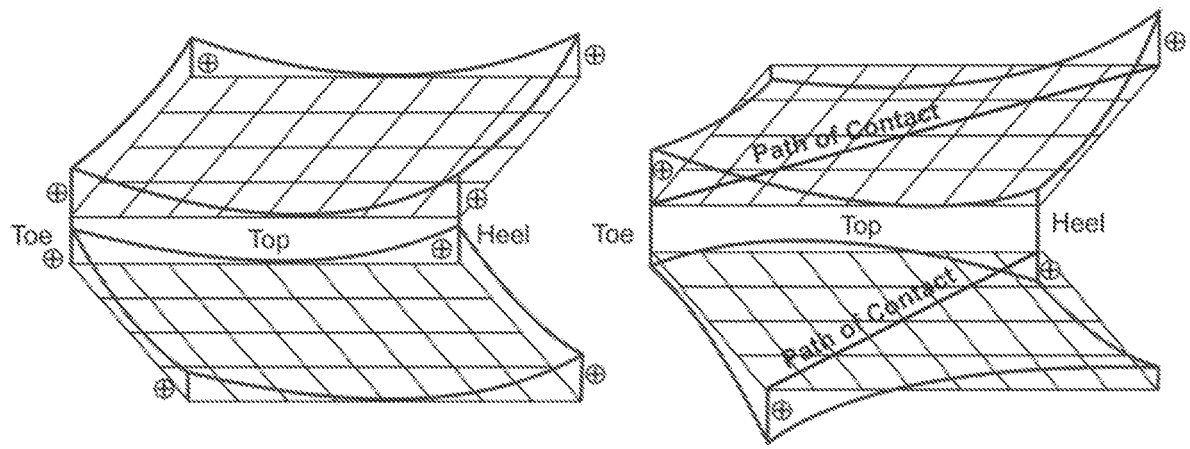
FIG. 9 shows a flank deviation plot wherein the deviations represent the errors of a real flank form versus a theoretically calculated flank form.
Figures 10A, 10B:
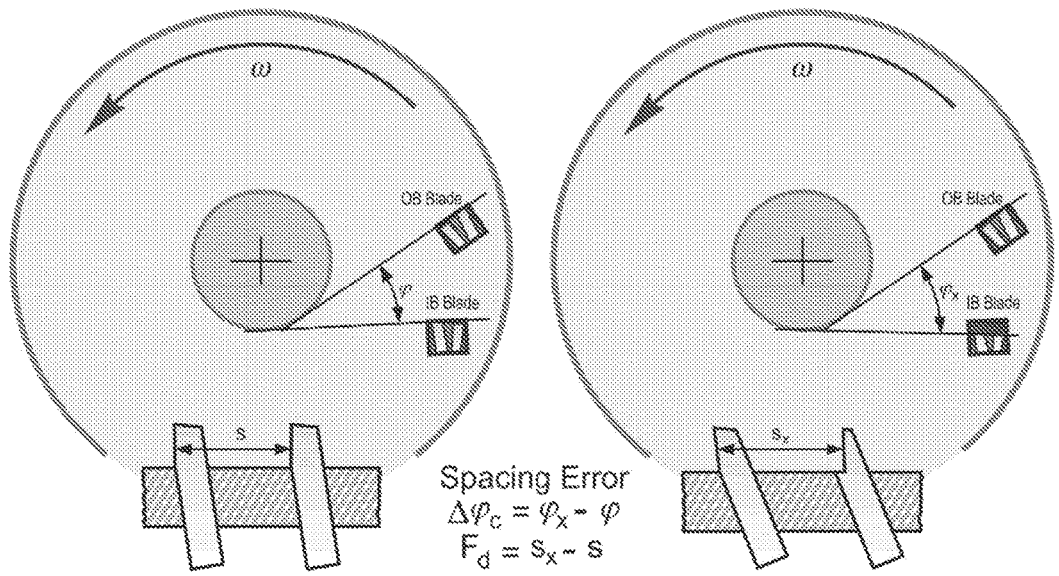
FIG. 10(*a*) shows a reference cutter head with 2-face blades wherein only one blade group (outside and inside blades) is represented.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

In the context of the invention, the term "bevel" gears is understood to be of sufficient scope to include those types of gears known as bevel gears, "hypoid" gears, as well as those gears known as "crown" or "face" gears.

The problem to be solved is to find a blade geometry where the following blade geometry parameters are preferably determined in parallel:
Effective cutting edge hook angle
Front clean-up amount
Effective cutting side rake angle
Calculations for outside and inside blade in parallel
Blade spacing Face hobbing cutter blades are positioned in a particular cutter head with a certain blade slot offset. The face hobbing motion causes the relative velocity vector between cutting blade and work piece to point in a direction that is not coincident with one of the axis directions of the cutting blade. As a result, the angles ground on the blade are not the angles that make a blade "sharp" or "dull" with respect to a workpiece during cutting. In the cutting process, it is not the actual angles on the blade, but the effective angles of side rake, top rake and cutting edge hook angles of the blades, realized as a result of the face hobbing motion between tool and work piece, that are relevant and which determine if the cutting is optimal. The effective angles are the angles realized as a result of being "in the cut". The angles ground on a blade, the orientation of the blade positioned in a certain cutter head, and the face hobbing motion between work piece and cutter all contribute to the effective angles between the cutting edge and the material of the work piece.

Because of the cross influences between the parameters which are present in the inventive solution, a closed analytical solution of the 3-face blade geometry is not practical. The approach of the inventive idea is a combination of imbedded iterations and single direction step approximations, preferably with certain abort criteria or maximum number of steps, in order to achieve a sufficient front clean-up and realize the effective input values. The preferred calculation scheme which is represented in FIG. 11 achieves a stable and convergent behavior of the calculations while maintaining a fast algorithm.

Figure 11:
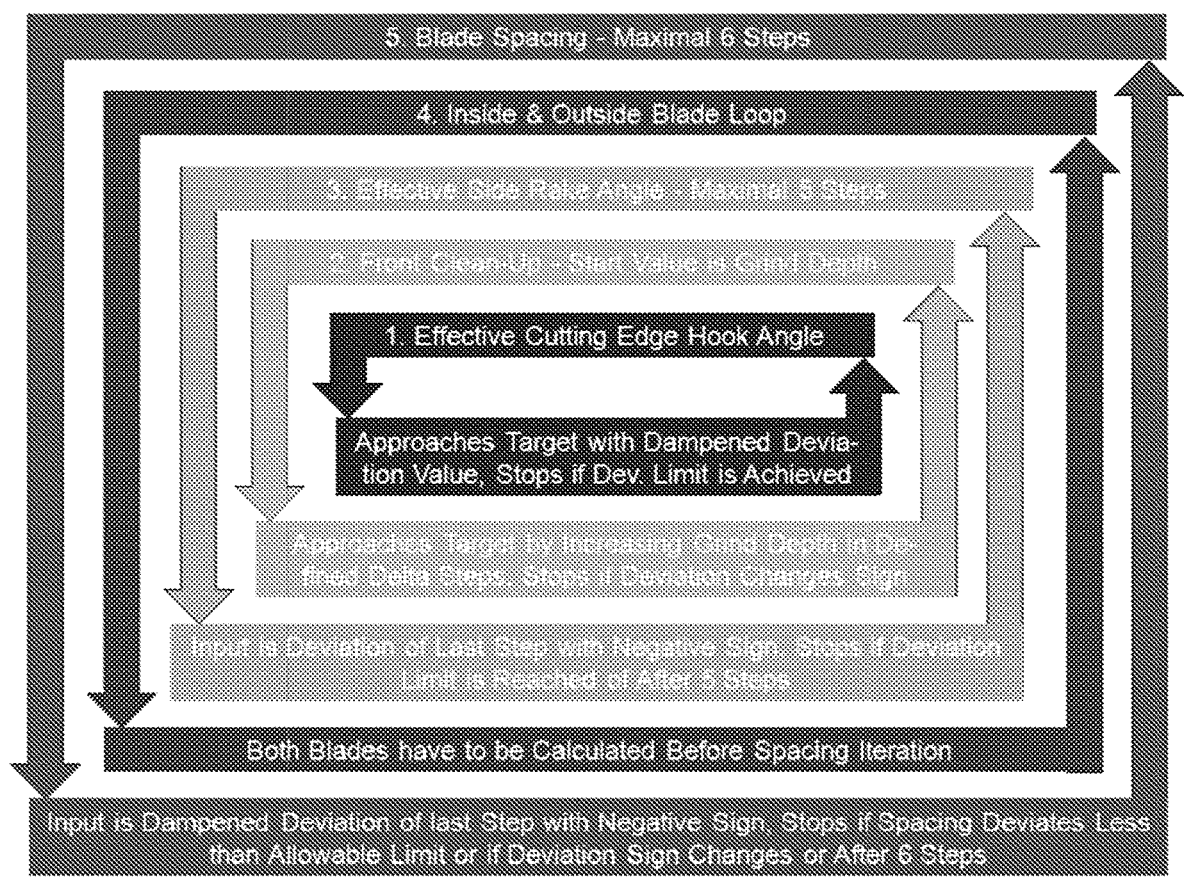
FIG. 11 represents five imbedded loops for 3-face blade determination.

Loop No. 1 (inner iteration loop) shown in FIG. 11 influences the top rake angle on the blade front face in order to achieve the given effective cutting edge hook angle. At the end of each calculation step, the effective cutting edge hook angle is determined and the difference between this number and the desired input value is preferably multiplied by a damping factor (e.g. 0.5) and then subtracted from the top rake angle used in the last step. After that, Loop No. 1 is repeated until the deviation between the actual and the nominal value is below a predetermined limit. Use of a dampening factor reduces or eliminates the possibility of a deviation that may be too large for the iteration to function properly, resulting in a more stable iteration.

Figures 12, 13:
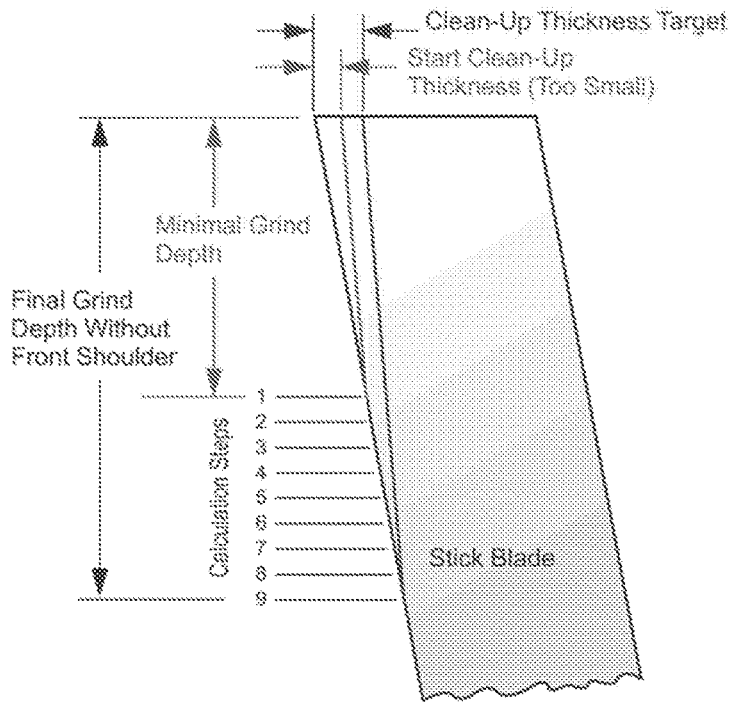
FIG. 12 is a bevel gear cutting blade which illustrates the blade front clean-up of Loop No. 2 in FIG. 11.
FIG. 13 is a blade grinding summary output section for 3-face blades showing the effective blade geometry.

Loop No. 2 in FIG. 11 is preferably a single direction step approximations. The lead parameter of this iteration is the grind depth (see FIG. 12). The calculation begins with the minimally required grind depth. This loop preferably accomplishes two things at the same time. First, the front clean-up has to cover the entire length of the cutting edge in order to correctly cut the whole depth of the gear. Secondly, the clean-up thickness at the tip of the blade has to be equal or above a given minimal value. FIG. 12 shows 9 steps, starting at the minimal grind depth to the final grind depth. After each step, the clean-up thickness is checked to determine if it is still below the target value. If so, another step is performed at an incrementally increased grind depth. When the clean-up thickness, calculated at the end of Loop No. 2, passes the target value for the first time, the front clean-up loop ends and Loop No. 3 in FIG. 11 finishes the first step of calculating the effective cutting side rake angle for a blade geometry which already shows the correct effective cutting edge hook angle as well as the correct front clean-up.

The result of the effective side rake after finishing the first step of the Loop No. 3 iteration may not deliver the desired effective side rake angle because the two inner loops in FIG. 11 will change the cutting direction relative to the blade coordinate system enough that several corrective repetitions of this loop are required. Corrective input is the deviation (with negative sign) between actual and nominal effective side rake angle. Although this procedure makes this loop an iteration, the loop ends if either the deviation limit is satisfied or after a maximum number (e.g. 5) of steps.

The algorithm of iterations and correction loops in FIG. 11 includes two additional loops (No. 4. and No. 5.) in order to achieve the desired goal of re-establishing the original blade spacing. Loop No. 4 repeats all previously discussed loops for both blades involved in cutting one pinion or gear slot. The outer loop (Loop No. 5) will determine the actual blade spacing angle φ (which requires that both inside and outside-blade calculations have been finished at this point) and processes this value in order to decide which blade (inside or outside) has to receive a certain amount of additional front clean-up thickness $\Delta S_x$. The corrective repetition of all four inner loops uses a dampened amount of $\Delta S_x$ (reduced amount). All inner loops are repeated until their abort criteria are reached. The outer blade spacing iteration loop repeats until the actually achieved blade spacing deviation from the original (desired) spacing is below a defined iteration limit, or if the deviation value changes its sign (or it aborts after a maximum number (e.g. 6) of steps). The dampening factor (e.g. 0.5) and the number of steps may be adjusted such that the overall system of loops functions in a stable manner and the final results in all evaluated cases are within acceptable accuracy limits.

FIG. 13 is the blade grinding summary output section with the effective blade geometry. Lines 02 and 05 show the effective cutting edge hook angle of 1.00° and the effective cutting side rake angle of 4.50° respectively. Those values are identical with the input values of the calculation algorithm where the correct values have been achieved by the algorithm. In the output in FIG. 13, the blade spacing correction is evident in the fact that the effective tip clean up thickness of 1.32 mm for the outside blade (line No. 07) varies from the target value of 1.00 mm (line No. 06).

Face milling designs do not require the outer iteration loop No. 5 (FIG. 11) because the tooth thickness is independent from the blade spacing.

The iteration loops may be carried out utilizing commercially available blade grinding software as is known to the skilled artisan, such as, for example, CAGE Blade Grinding Software available from The Gleason Works, Rochester, N.Y.

Figure 14:
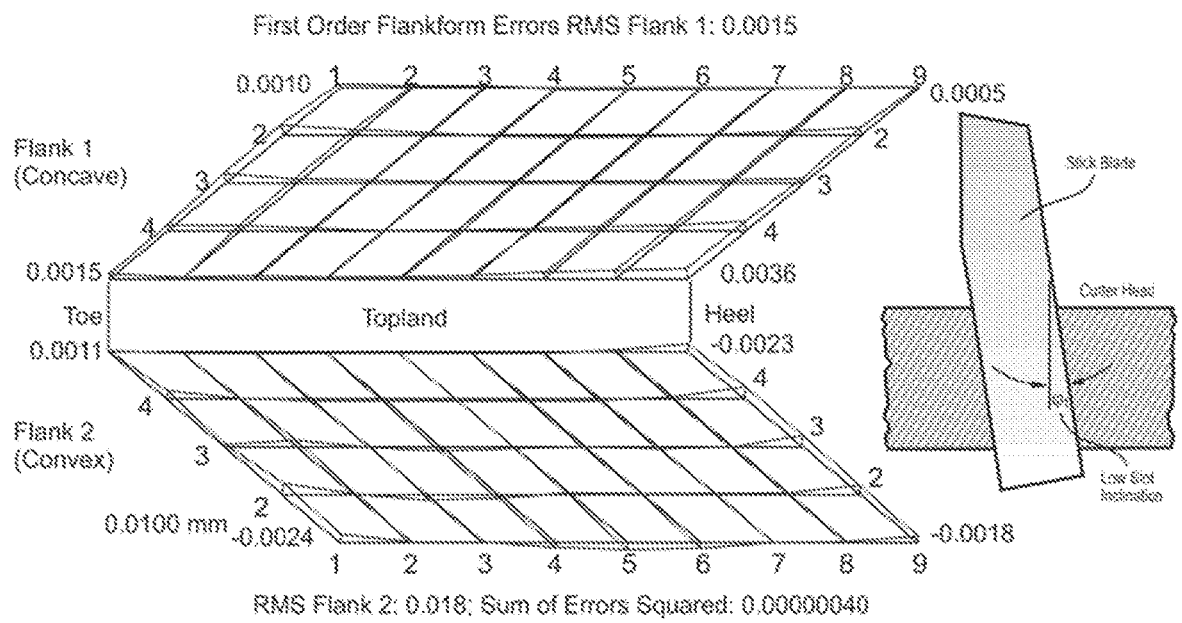
FIG. 14 shows measurement results of a pinion cut with 4.42° cutter slot inclination and a 2-face blade (equal reference blade and reference cutter) that was measured with a coordinate file which reflects the reference blade and the reference cutter.

The flank form measurement results in FIG. 14 are the baseline for a pinion cut with a 2-face ground blade built in a cutter head with 4.42° slot inclination (equal reference blade and reference cutter) and measured with a coordinate file which reflects exactly the reference blade and the reference cutter. The corner point deviation of less than 4 μm in FIG. 14 leads to a Sum of Errors Squared of 0.00000040 inch$^2$, which is a very good result for cutting before heat treatment.

Figure 15:
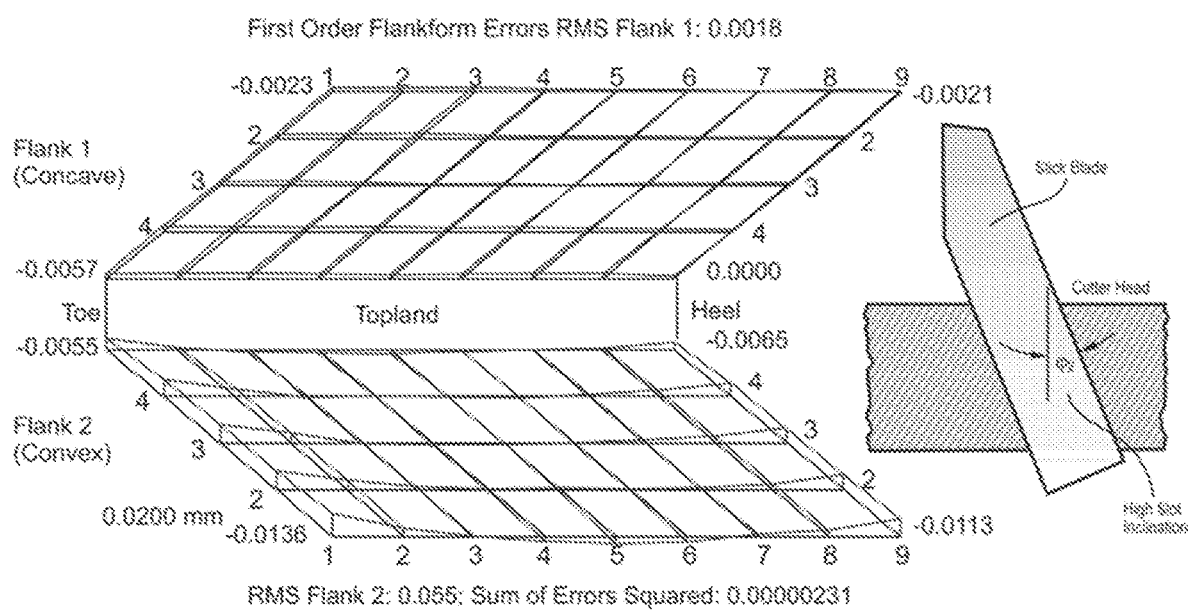
FIG. 15 shows measurement results of a pinion cut with a 3-face ground blade which was built in a cutter head with 12° slot inclination.

The measurement results in FIG. 15 also use the standard coordinate file which is based on reference blades in a reference cutter. The measured pinion was cut with a 3-face ground blade which was built in a cutter head with 12° slot inclination. The measurement was conducted with the standard coordinate file which is based on reference blades in a reference cutter (2-face blades and cutter with 4.42° slot inclination). The blade grinding summary for this test was determined with an algorithm which did not include the inventive method. FIG. 15 shows the deviations of the cut pinion, which are nearly 14 μm. The Sum of Errors Squared is 0.00000231 inch$^2$ which is still acceptable for a soft cut pinion before heat treatment but the surface deviations are significantly larger than the ones in FIG. 14. The $\Delta R_w$ blade point radii correction to maintain the correct tooth thickness, which was used to prepare the cutting blades, causes the length crowning which is more visible on the convex flank.

Figure 16:
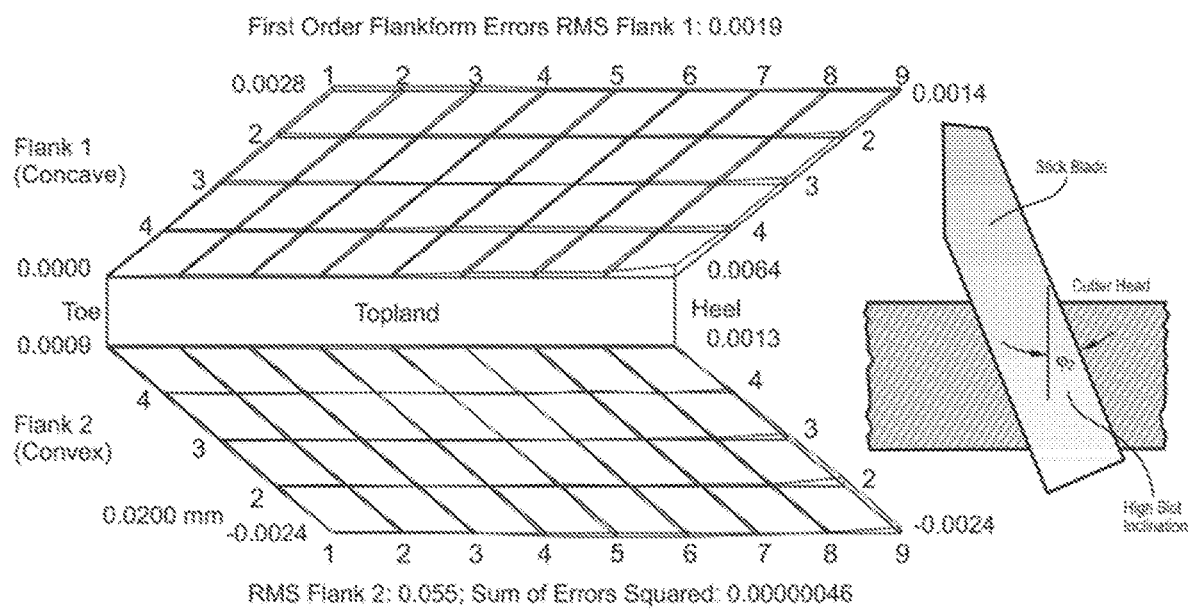
FIG. 16 shows measurement results of a pinion cut with a 3-face ground blade which was built in a cutter head with 12° slot inclination.

The results obtained with 3-face blades which have been ground according to the inventive method are shown in the flank deviation graphic in FIG. 16. The 3-face blade calculation was repeated utilizing the inventive method. A pinion manufactured with the new 3-face blade geometry in a cutter head with 12° slot inclination angle was measured with a coordinate file, based on a reference blade in a reference cutter (2-face blades with 12° blade side rake angle used in a cutter with 4.42° slot inclination) and shows a single micron flank form deviation with an Sum of Errors Squared of 0.00000046 inch$^2$.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of grinding 3-face ground cutting blades for producing gears by a face hobbing cutting process, said method comprising:
    providing an inside cutting blade and an outside cutting blade wherein each of said inside and outside cutting blades comprises a plurality of grinding surfaces including at least a cutting side surface, a clearance side relief surface and a front face, said inside cutting blade and said outside cutting blade being positionable in consecutive blade mounting slots of a face hobbing cutter head,
    grinding at least one of said cutting side surface, said clearance side relief surface and said front face on each of said inside cutting blade and said outside cutting blade to produce at least a predetermined effective cutting edge hook angle and a predetermined effective cutting side rake angle on each of said inside cutting blade and said outside cutting blade,
    grinding the front face of at least one of said inside cutting blade and said outside cutting blade whereby when positioned in said consecutive blade mounting slots of said face hobbing cutter head, the front face of said inside cutting blade and the front face of said outside cutting blade defining an initial blade spacing angle φ.

2. The method of claim 1 wherein the front face of said inside cutting blade and the front face of said outside cutting blade are each ground to effect a clean-up of each front face.

* * * * *